United States Patent [19]
Fite, Jr. et al.

[11] Patent Number: 5,666,489
[45] Date of Patent: Sep. 9, 1997

[54] METHOD AND APPARATUS FOR ENHANCING CAPABILITIES OF OFFICE MACHINES

[75] Inventors: Franklin Fite, Jr.; Kurt D. DelBene, both of Bellevue, Wash.

[73] Assignee: Microsoft Corporation, Redmond, Wash.

[21] Appl. No.: 271,011

[22] Filed: Jul. 6, 1994

[51] Int. Cl.$^6$ .................................... G06F 13/00
[52] U.S. Cl. ............... 395/200.5; 395/834; 395/183.17; 395/200.58; 358/442
[58] Field of Search ................ 395/200.02, 200.03, 395/200.09, 200.1, 835, 500, 650, 800, 200.15, 828, 834, 837–839, 182.11, 183.17, 184.01; 358/350, 400, 403, 442; 355/200, 18; 371/9.1, 11.1; 364/131–132

[56] References Cited

U.S. PATENT DOCUMENTS

| | | | |
|---|---|---|---|
| Re. 35,050 | 10/1995 | Gibbs et al. | 379/93 |
| 3,921,148 | 11/1975 | Ophir et al. | 395/166 |
| 4,614,978 | 9/1986 | Doster et al. | 358/470 |
| 5,033,804 | 7/1991 | Faris | 312/223.3 |
| 5,265,205 | 11/1993 | Schroder | 395/200.09 |
| 5,283,827 | 2/1994 | Conforti et al. | 379/399 |
| 5,412,779 | 5/1995 | Motoyama | 355/203 |
| 5,459,579 | 10/1995 | Hu et al. | 358/296 |
| 5,530,740 | 6/1996 | Irribarren et al. | 379/89 |
| 5,557,780 | 9/1996 | Edwards et al. | 395/500 |

FOREIGN PATENT DOCUMENTS

| | | |
|---|---|---|
| 0484145 | 5/1992 | European Pat. Off. . |
| 0532796 | 3/1993 | European Pat. Off. . |
| WO9325041 | 12/1993 | WIPO . |

OTHER PUBLICATIONS

IBM Technical Disclosure Bulletin, *Enhancement of Facsimile Functions*, vol. 32, No. 8A, Jan. 1990.
Telecom Report, *Ubertragen, Drucken und Scannen mit einem Gerat*, vol. 15, No. 1, Jan. 1992.

*Primary Examiner*—Alpesh M. Shah
*Attorney, Agent, or Firm*—Klarquist Sparkman Campbell Leigh & Whinston, LLP

[57] ABSTRACT

A method and apparatus for enhancing the capability of office machines, namely fax machines, includes coupling the office machine to a personal computer and enabling the office machine to access enhanced features supported in the personal computer. After identifying whether the personal computer is available and determining the capabilities it supports, the office machine can operate in an enhanced mode using the resources of the personal computer and can advertise its enhanced capabilities to other machines. The office machine still retains its ability to operate stand-alone mode if the personal computer is not available.

24 Claims, 2 Drawing Sheets

METHOD AND APPARATUS FOR ENHANCING CAPABILITIES OF OFFICE MACHINES

FIELD OF THE INVENTION

The invention relates to interfacing a personal computer with standard office machines such as fax machines, copiers, or printers to enhance the capability of the office products.

BACKGROUND AND SUMMARY OF THE INVENTION

To make today's office more productive, makers of office machines such as copiers, fax machines, and printers have capitalized on the low cost of processors and memory to convert simple machines into "intelligent" machines with much greater functionality. Even such "intelligent" office machines, however, have limited memory, processor and long term storage capabilities relative to the personal computer (PC). For example, it would be advantageous to provide enhanced facsimile features such as secure messaging, binary file transfer, inbound routing to a PC network, scanning and printing with a PC, remote administration, and so on. Yet, standard "Group 3" fax machines available today cannot support such enhanced capabilities.

One way to satisfy this market need would be to build a new office machine with these added capabilities. This solution, though quite viable for tomorrow's era of machines, may require substantial modifications to existing office machine hardware. Instead of creating entirely new machines to support enhanced capabilities, existing office machines need only be modified so that they can communicate and interact with a computer. By slightly modifying existing fax machines and coupling them to a PC, the fax machine may operate as if it were equipped with a wide range of enhanced capabilities.

Office machines have been coupled to a PC, but until this invention, they have not exploited the resources of the PC in a general way. For example, some fax machines have been coupled to a PC to perform basic functions such as printing. This use of the PC does not enable the fax machine to access many types of information on the PC such as document or image files, or address books, for example. Fax modems and associated software utilize the resources of the PC in a more general way, but they have no stand-alone capability. The fax modem must be coupled to a PC just to provide the functionality of a standard fax machine. Existing methods for coupling a PC to an office machine do not address the problem of making the resources of the PC available to a variety of office machines, while still retaining the office machine's ability to operate in a stand-alone mode.

The desired method for making the resources of a PC generally available to an office machine must enhance the capabilities of stand-alone machines in a manner that may be adaptable to a variety of office machines. In effect, the office machine should be capable of operating in dual modes: an enhanced mode where the resources of the PC are exploited, and a standard mode where the PC resources are not available. This dual mode would provide for more flexible operation of the office machine because it would not be dependent upon the PC. Moreover, the process of adding capabilities to a variety of stand-alone machines could be generalized. Ultimately, a variety of stand-alone machines could be coupled to a PC using most of the same basic software and hardware.

It is an object of the invention, therefore, to provide both a method and apparatus for enhancing the capabilities of an office machine that allow the office machine to more effectively exploit the resources of a PC.

It is a further object of the invention to provide a method and apparatus for enhancing the capabilities of an office machine that enable the office machine to operate in a dual mode providing enhanced capabilities, yet retaining stand-alone functionality.

It is yet another object of the invention to provide a method and apparatus for enhancing the capabilities of an office machine that can be supported across a variety of office machines with a variety of capabilities and features.

To achieve these objects, the invention provides a method and apparatus for enhancing the capabilities of an office machine. The method includes interfacing a computer with an office machine through interfaces on each machine, and then determining whether the computer is available by accessing the computer from the office machine. If the computer is available, the method includes transferring information identifying the enhanced capabilities of the computer to the office machine. If the computer is not available, the method includes operating the office machine without enhanced capabilities provided by the computer. The method, thus, enables he office machine to operate in dual modes: an enhanced mode when the computer is available, and a standard mode when the computer is not available.

The method according to the invention may include various additional steps. The method may include passing capabilities of the computer to a capability determination module on the office machine, and then selecting a protocol of the office machine based on information in the capabilities determination module. The method may also include advertising the enhanced capabilities of the office machine to other machines when the computer is available. To prevent other machines from attempting to use enhanced capabilities of the office machine when the computer is not available, the method may include instructing the other machine not to store the existence of the enhanced capabilities. Finally, the method may include transferring data between mass storage on the computer and the office machine when the office machine operates in enhanced mode.

The invention may also include an apparatus for enhancing the capabilities of an office machine. This apparatus includes a computer having an office machine interface, and an office machine having a computer interface, and a capabilities determination module. The computer and office machine are in communication with each other through the office machine and computer interfaces. The capabilities determination module is in communication with the computer interface for obtaining and storing capabilities from the computer. The capabilities determination module may also be in communication with an enhanced and a standard protocol module for selecting a protocol for communication with other machines.

The methods and apparatus of the invention have the advantage of enhancing the capabilities of office machines without eliminating the office machine's ability to function in a stand-alone mode. The office machine can exploit the resources of the computer by obtaining access to a wide range of capabilities available on the computer as opposed to merely using the computer to perform a basic function such as printing. The invention is adaptable to many different types of office machines having varying built-in capabilities° Thus, the concepts of the invention may be applied to enhancing the capabilities of fax machines from various vendors, and can easily be extended to different types of office machines such as copiers, printers, etc.

The advantages and features of the invention will become apparent to those skilled in the art from the following description and accompanying drawings.

DETAILED DESCRIPTION

This invention provides both a method and apparatus for enhancing the capabilities of office products by coupling them to a PC. The invention allows the office machine to operate in dual modes: 1) enhanced mode where the office machine takes advantage of the resources of the PC, and 2) standard mode where the office machine operates in a stand-alone mode. The following description explains a mere example of the invention in the context of the fax machine. Later, the description describes this fax machine implementation in more detail with reference to FIG. 2. Finally, the methods according to the invention are described with the aid of specific examples in the fax machine context.

Even though the invention will be described in the specific context of a fax machine, it should be understood that the general concepts used to enhance the capabilities of a fax machine apply to other office products such as printers, copiers, electronic wallets, telephones and personal digital assistant machines. Today's advanced office machines share common functions, have their own processors and memory, and can communicate with PCs and possibly other office machines. For instance, both the copier and fax machine perform the basic function of scanning and printing, can have processors and memory, and can be modified to communicate with a PC and perhaps each other. Though these office machines were originally designed to provide a single basic function, office machines now have enhanced capabilities to communicate and process messages. As such, the invention is not limited to fax machines, but rather, extends to all office machines that can transfer and process messages.

Figure 1:
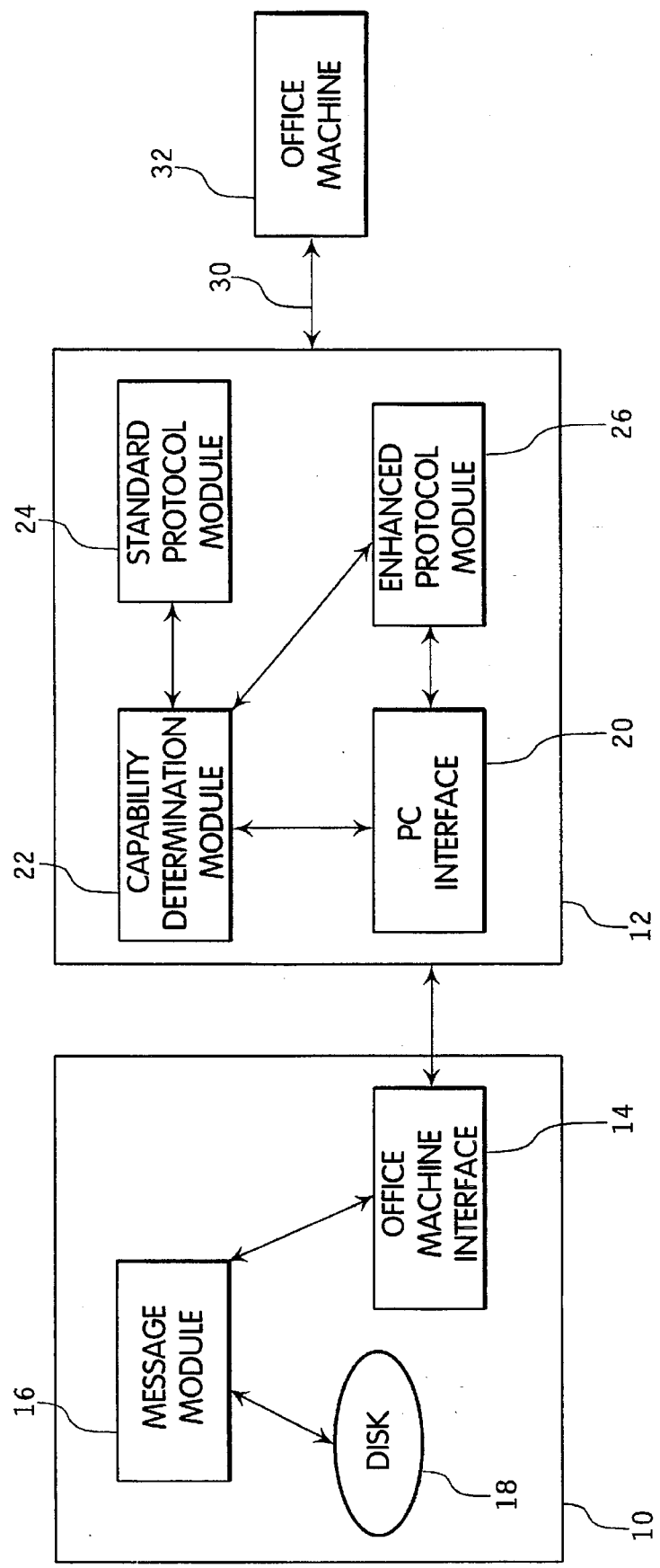
FIG. 1 is a block diagram of the apparatus for providing enhanced capabilities to an office product according to an embodiment of the invention.

FIG. 1 is a high level block diagram representation of an embodiment of the invention. This embodiment shows a personal computer (PC) 10 in communication with a fax machine 12. To more clearly illustrate aspects of the invention, certain widely known and commonly used hardware elements are not shown as part of the PC 10 and fax machine 12 in FIGS. 1 and 2. The PC includes a central processing unit and main memory. The fax machine 12 has a processor and includes memory for loading software. Preferably, the fax machine 12 should contain 512 KB of memory for loading the software of this embodiment. Though the processor and memory of the PC and fax machine are not specifically shown in FIG. 2, it should be understood that both the PC and fax machine behave as a standard computer to execute computer software. As described below, portions of the invention may be implemented in software, hardware, or a combination of both. To the extent that portions of the embodiment are implemented in software on the fax machine 12, this software may be loaded or installed onto RAM devices located within the fax machine.

The block representing the PC 10 in FIG. 1 includes an office machine interface 14, a message module 16, and a disk 18. Used to facilitate communication with the office machine, the office machine interface 14 may incorporate any of a number of well known communication facilities of PCs such as a serial or parallel port, or a local-area network communication facility as will be described in more detail with reference to FIG. 2.

The message module 16 is a computer program executed by the PC 10. This program may include a separate module to process message data sent to or received from the office machine 12. A "message" in this context means user-to-user or machine-to-machine messages such as faxes or electronic mail as opposed to an inter-process communication messages used in communication among software processes. The message module may also include a separate module to determine capabilities of the PC that are available to enhance the functionality of the fax machine 12. The capabilities of the PC generally refer to providing access to the hard disk and all data stored therein, improved resolution of images, scanning and printing using the PC, remote administration of office machines, etc. In the context of fax machines, the PC could be used to support various features such as secure messaging, binary file transfer, and inbound routing to a PC network, to name a few. An advantage of the invention is that the PC capabilities may be modified to support new features that could then be used with an existing stand-alone office machine.

The block representing the fax machine 12 in FIG. 1 includes a PC interface 20, a capability determination module 22, a standard protocol module 24, and an enhanced protocol module 26. The PC interface includes software and hardware necessary to establish communication with the PC 10 and to relay information on capabilities and messages to and from the PC 10. The PC interface 20 enables the capabilities determination module 22 to communicate with the PC 10 and determine whether the resources of the PC are available. If the resources of the PC 10 are available, the enhanced protocol module 26 may communicate with the PC through the PC interface 20 so that the resources of the PC may be used in sending and receiving messages. For example, a file stored on the disk 18 of the PC may be included as an attachment of a fax sent from the fax machine.

The capability determination module 22 is a program executed in the fax machine 12 that establishes the capabilities of the machine based on the capabilities built into the fax machine 12, and, if the PC 10 is available, based on the enhanced capabilities provided by the PC 10. Depending on the particular construction of the fax machine 12, this program may be implemented in software, hardware, or a combination of software and hardware. If the PC is available, the capability determination module 22 determines the enhanced capabilities provided by the PC 10 and selects the enhanced protocol module 26 to handle the transfer of messages between the fax machine 12 and another office machine 32 via a communication facility such as a phone line 30. In cases where the PC 10 is not available, the standard protocol module 24 is selected, and only the capabilities available on the fax machine 12 itself are used in handling message transfers through the standard protocol module 24. The term, "available," in this context means that the PC is on and is capable of responding to the office machine in a predetermined period of time. The time period during which the PC interface attempts to establish communication with the PC may be a configurable parameter according to the desired performance of a particular application. For example, many fax machines hang up after a certain number of rings. One may wish to set the time period for waiting for a response from the PC to correspond to a time just before the fax machine will hang up.

The standard and enhanced protocol modules are programs executed in the fax machine to process the transfer of messages over the phone line 30. These programs may be implemented in software, hardware or a combination of both. The standard protocol is the T.30 protocol for Group 3 fax machines and is thus generally known in the field. Established by the Comite Consultatif Internationale de Telegraphie et Telephonie (CCITT), Group 3 is one of the four groups defining facsimile transmission standards. Group 3 is designed for digital data transfer over an ordinary telephone line. Within the Group 3 standard, there are various recommendations that relate to aspects of facsimile transmission. Recommendation T.4 defines a data compression standard, while Recommendation T.30 defines a protocol standard. In general, the Group 3 standard supports "standard" and "fine" images, two methods of data compression, password protection and polling. Office machines developed to communicate using the Group 3 standard are called "Group 3 office machines."

The T.30 protocol includes five phases of facsimile transmission: A) a call set up phase that includes establishing a call between calling and receiving device; B) a pre-message phase that includes identifying and selecting data encoding and processing capabilities; C) a message transmission phase that includes transferring data, synchronization, error detection and correction, and line supervision; D) a post message phase that includes signalling the end of the message and confirming the message; and E) a call release phase that includes terminating the call.

During phase B, the receiving device transmits a digital identification signal (DIS) data frame describing its data encoding and processing capabilities. The transmitting device responds with a confirming signal and selects a mutually compatible format. A non-standard facilities (NSF) data frame may also be sent in phase B. A transmitting fax machine may use the NSF frame to identify the so-called "non-standard facilities" to a receiving fax machine, such as user identification information, passwords, and facsimile relay.

The enhanced protocol is a protocol that has the same basic attributes of the standard T.30 protocol, and in addition has features to support a wide range of additional capabilities such as binary file transfer, encryption, decryption, routing messages, processing color images, etc. When the enhanced capabilities of the PC are present, the enhanced protocol module 26 advertises these capabilities to another machine 32 communicating with the fax machine over the phone line 30. The enhanced protocol module 26 advertises these enhanced capabilities by identifying them in an NSF frame sent to the other machine.

Figure 2:
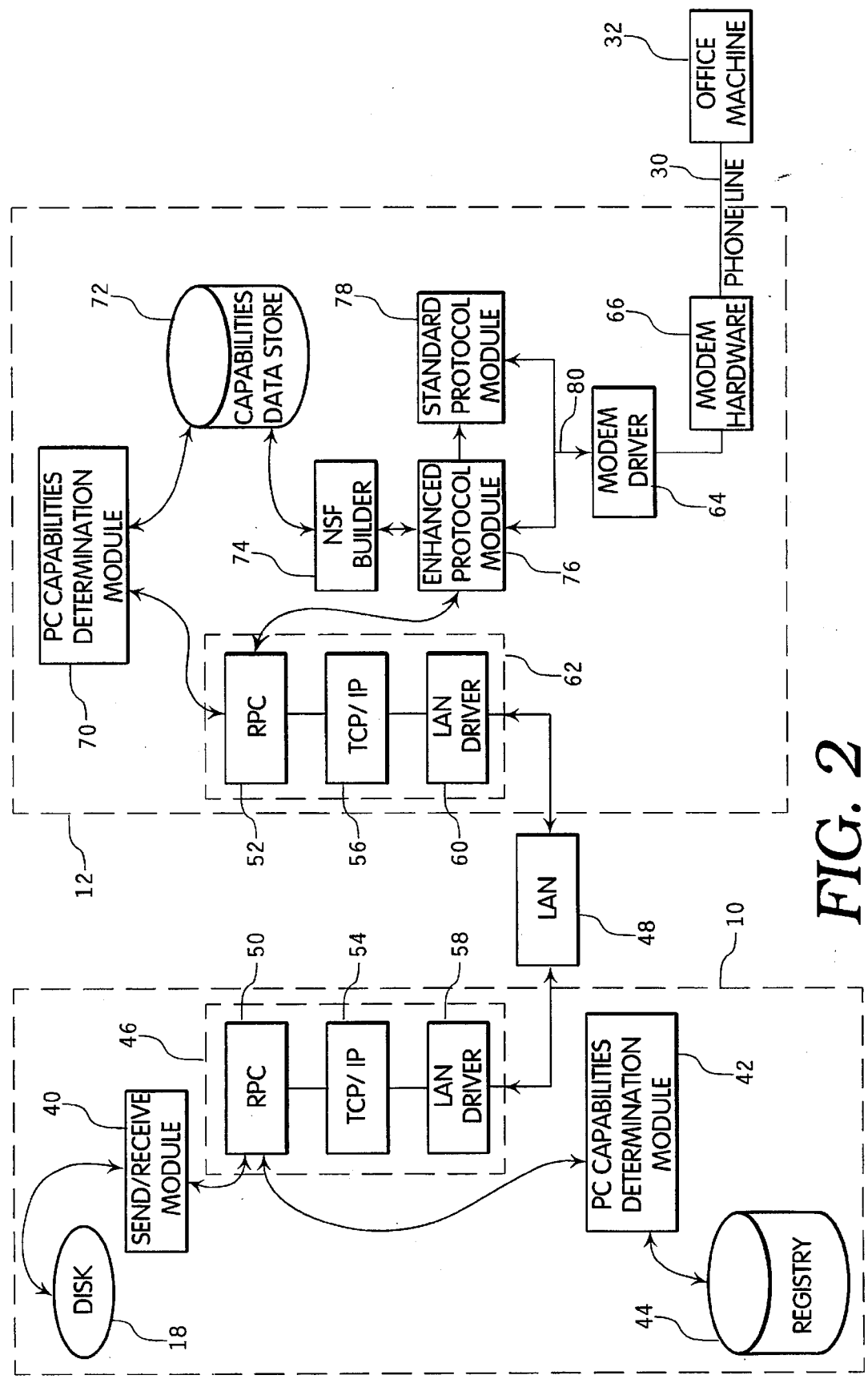
FIG. 2 is a block diagram illustrating in more detail an apparatus for providing enhanced capabilities to an office product according to an embodiment of the invention.

FIG. 2 is a block diagram illustrating the apparatus used to enhance the capabilities of a Group 3 fax machine. The PC includes a disk 18, a send/receive module 40, a PC capabilities determination module 42, a registry 44, and an interface 46 adapted for a local area network (LAN) 48. The PC 10 and the fax machine 12 communicate through the LAN 48, and each have the following standard hardware and software associated with LAN communication: a Remote Procedure Call module (RPC) 50, 52, a Transport Control Protocol/Interface Program TCP/IP module 54, 56, and a LAN driver 58, 60. The fax machine 12 includes a PC interface 62 adapted for the LAN 48, software modules associated with capability determination 70 and fax protocols 76, 78, and a modem driver 64 and modem hardware 66 typically found in fax machines for sending and receiving the fax data through the phone line 30. The protocol modules include a standard protocol module 78 and an enhanced protocol module 76.

The interfaces to the LAN 48 correspond to the office machine interface 14 and the PC interface 20 of FIG. 1. The RPC modules 50, 52 in the PC and fax machine are well-known software communication mechanisms for passing instructions and data between processes coupled by a LAN. On the PC side, the RPC module 50 communicates with the send/receive module 40 to pass fax messages and other data to and from the disk 18. The RPC module 50 in the PC also communicates with the PC capabilities determination module 42 to send fax capabilities information to the fax machine 12. On the fax machine side, the RPC module 52 communicates with a PC capabilities determination module, 70 to send requests for capabilities to the PC 10 and to receive capabilities if the PC is available. The RPC module 52 also communicates with the enhanced protocol module 76 to pass on message and other data from the disk 18. The TCP/IP modules 54, 56 implement a transport protocol for sending data through the LAN 48, and the LAN drivers 58, 60 are-the software to hardware interface to the LAN 48. These TCP/IP modules 54, 56 as well as the LAN drivers 58, 60 are widely known and used communication tools in the software field.

Though this particular example specifically relates to LAN communication, it should be understood that other forms of communication may be used as well. Depending on the communication speed and functionality required in the link between the PC and the fax machine, the office machine and PC interfaces 46, 62 could be adapted for the parallel or serial ports that are commonly used in PCs. Communication between the office machine and the PC 10 could be "on demand," meaning that office machine could access the PC only when necessary such as when a fax machine receives an incoming fax. Communication could also occur in the background such as where the fax machine periodically calls the PC to check if it is available. As another alternative, the PC could signal the office machine when it is turned off by transferring a signal through a parallel port. As illustrated in the preceding examples, the actual form of communication is not critical to the invention and may be tailored to the specific design requirements of an application.

Referring again to the PC 10, the send/receive module 40 and PC capabilities determination module 42 form part of the message module 16 of FIG. 1. The send/receive module 40 handles the transfer of data to and from the disk 18. The PC capabilities determination module 42 in the PC 10 indicates whether the PC is "alive" or, in other words available, in response to a request from the fax machine 12. The PC capabilities determination module 42 communicates with the registry 44 to obtain information on the status of the PC 10. If the PC 10 is available, and its capabilities have changed, then the PC capabilities module 42 sends its capabilities to the fax machine 12.

The registry 44 represents a data structure for storing the state of the PC; i.e. whether the PC availability of memory and mass storage space, what application programs are available on the PC, etc. Those familiar with the Windows NT operating system from Microsoft Corp. of Redmond, Wash., know that the "registry" refers to a data structure where this kind of information is stored. In computers running other operating systems, information on the state of the computer is also accessible, but not necessarily in a single data structure such as the registry in Windows NT.

Referring now to the fax machine side, the PC capabilities determination module 70, the capabilities data store 72, and the NSF (non-standard facilities) builder 74 correspond to the capability determination module 22 of FIG. 1. The PC capabilities determination module 70 in the fax machine 12 determines whether the PC 10 is available and if so, determines whether the capabilities of the PC have changed. If the capabilities have changed, this module receives information about the capabilities from the PC 10 through the PC interface 62. These capabilities are added to the capabilities data store 72, which is a data structure in the form of a list of capabilities.

The PC capabilities determination module 70 makes a function call to the PC capabilities determination module 42 in the PC 10 to determine whether the PC will respond. The time during which the fax machine 12 waits for a response can be a configurable parameter. If the PC 10 responds, then the PC determination module 42 answers with a value indicating that the PC 10 is available. The return value of the function call then reflects that the PC 10 is available. If the PC 10 does not respond, such as when it is turned off or is busy executing another process, the return value of the function call reflects that the PC 10 is not available.

In the case where the PC 10 is available, the capabilities determination module 70 makes a second function call to determine whether capabilities provide by the PC 10 have changed. The PC capabilities module 42 on the PC 10 then answers with a value indicating whether the capabilities have changed.

If the capabilities provided by the PC 10 have changed, the PC capabilities module 70 makes a function call to the PC capabilities module 42 in the PC 10 to get an identification or listing of the current capabilities. The PC capabilities module 42 on the PC 10 then sends a list of information identifying the capabilities to the PC capabilities module 70 on the fax machine 12. The PC capabilities module 70 on the fax machine 12 then loads this information into the capabilities data store 72. The PC determination module 70 may load this information into the capabilities data store 72 by merging the information into the list of capabilities in the capabilities store. If the capabilities provided by the PC 10 have not changed, then the capabilities data store 72 already contains information to identify capabilities provided by the PC 10.

The NSF builder 74 creates a frame of information designating the protocol to be used in fax communication and identifying the capabilities of the fax machine 12. The NSF builder 74 places information in an NSF frame designating whether the enhanced protocol module 76 or standard protocol module 78 is to be used in a communication with another office machine 32. The NSF frame also identifies the capabilities of the fax machine 12, which may include the enhanced capabilities provided by the PC 10. To construct this NSF frame, the NSF builder 74 takes information from the capabilities list in the capabilities data store 72 and maps this information into an NSF frame.

The enhanced protocol module 76 and the standard 78 protocol module correspond to the enhanced protocol module 26 and standard protocol module 24 of FIG. 1. In this embodiment, the enhanced protocol module 76 selects either the standard or the enhanced protocol by reading the NSF frame and determining whether the PC 10 is available. If the PC is available, the enhanced protocol is used. If the PC is not available, the standard T.30 protocol is used. In the former case, the enhanced protocol module 76 handles the transfer of fax data through a serial port of the modem driver. In the latter case, the enhanced protocol module 76 passes control to the standard protocol module 78, and the standard protocol module 78 handles the transfer of fax data through the serial port 80 of the modem driver 64.

It is not critical that the enhanced protocol module 76 select the fax protocol to be used in fax communications. This is merely an arbitrary design choice in this particular implementation. There are various ways of actually selecting the protocol to be used in communicating with another office machine. In this example, the capabilities determination module 70 indirectly controls the selection of the protocol by providing the information from which the NSF frame is built. The capabilities determination module 70 could, for example, select the appropriate protocol directly. Ultimately, it is only important that the protocol be selected based on the capabilities available and the availability of the PC.

The operation of the invention is most easily understood by way of example. The operation will now be discussed in the context of the fax machine-PC example previously described. The invention operates primarily in three stages: 1) the capabilities of the fax machine 12 are established depending on whether the PC 10 is available; 2) a protocol is selected based upon these capabilities; and 3) data associated with a fax communication may be transferred between the PC and the fax machine if the computer is available.

In a particular embodiment of the invention, stage one begins when the fax machine 12 is either originating or receiving a phone call. In response to this phone call, the PC interface 62 attempts to establish communication with the office machine interface 46. If this attempt fails, the PC interface 62 tells the PC capability determination module 70 on the fax machine that the PC is off. In this case, the capability data store 72 simply contains a list of the stand-alone capabilities of the fax machine 12. If the attempt to communicate with the PC 10 succeeds, the fax machine interface 46 relays the capabilities of the PC 10 to the PC interface 62. The PC interface 62 tells the PC capability determination module 70 that the PC 10 is on and identifies the capabilities of the PC. In this case, the capabilities data store 72 is updated to include a list of all of the additional capabilities provided by the PC 10.

In the second stage, the protocol used with the call is chosen based on information in the capabilities data store 72. If the PC 10 is off, the fax machine 12 uses the standard protocol module 78. The capabilities of the stand-alone machine are passed to the enhanced protocol module 76 in an NSF frame created by the NSF builder 74 from the capabilities data store 72. From this NSF frame, the enhanced protocol module 76 determines that the PC is off, and passes control to the standard protocol module 78. If the PC is on, the fax machine uses the enhanced protocol module 76. The enhanced capabilities are passed to the enhanced protocol module 76 in an NSF frame created by the NSF builder 74. Using this NSF frame, the fax machine 12 advertises to other fax machines the enhanced capabilities available in the fax machine 12.

Because the fax machine 12 will not always be operating in enhanced mode, the fax machine 12 instructs the other machine 32 in communication with it not to store the information in the NSF frame. Specifically, the NSF frame contains information that when read by another machine 32, causes the machine 32 not to store the information in the NSF frame. In future communication with the fax machine 12, the other machine 32 will not erroneously assume that the enhanced capabilities are present.

The third stage occurs only if the PC 10 is available. If it is, the enhanced protocol module 76 uses the PC interface 62 to communicate data associated with the phone call through the office machine interface 46 to the send/receive module 40. If desired by the PC user, the fax being sent or received can use the resources of the PC. For example, the fax can include attachments from the disk 18 or a received fax could be stored on the disk 18.

Having illustrated and described the principles of the invention in a preferred embodiment, it should be apparent to those skilled in the art that the invention can be modified in arrangement and detail without departing from such principles. We claim all modifications and equivalents coming within the spirit and scope of the following claims.

We claim:

1. In a system comprising a computer with an office machine interface and a stand-alone office machine with a computer interface and a capability determination module, wherein the computer and the stand-alone office machine are coupled to each other through the office machine and computer interfaces, and the stand-alone office machine has an enhanced protocol module and a standard protocol module, a method for enhancing the capability of the stand-alone office machine comprising:

from the stand-alone office machine, determining whether the computer is available by accessing the computer from the computer interface;

if the computer is available, then:

a) transferring an identification of message processing capabilities of the computer to the stand-alone office machine through the office machine interface;

b) placing the identification of the message processing capabilities of the computer in the capability determination module;

c) selecting the enhanced protocol module and operating the stand-alone office machine in enhanced mode using one or more of the message processing capabilities of the computer; and d) processing a message with the computer using one or more of the message processing capabilities of the computer, said processing including transferring the message between the computer and the stand-alone office machine;

if the computer is not available, selecting the standard protocol module and processing the message with the stand-alone office machine, in a stand alone mode only using one or more stand-alone capabilities of the stand-alone office machine;

wherein the stand-alone office machine includes a fax machine; and further including the step:

sending a first list or identification of enhanced capabilities of the fax machine to a second fax machine in communication with the fax machine when the computer is available to provide the enhanced capabilities; and sending a second list or identification of standard capabilities of the fax machine when the computer is not available to provide the enhanced capabilities.

2. The method of claim 1 where the office machine is a fax machine.

3. The method of claim 1 where the office machine includes a printer.

4. The method of claim 1 where the office machine includes a copier.

5. The method of claim 1 further including the step:

if the computer is available, then preventing the second fax machine from storing information identifying that the fax machine includes the enhanced capabilities provided by the computer.

6. The method of claim 1 wherein the computer includes a message module and a memory storage device; and further including the step:

if the computer is available, then using the message module in the computer to transfer the message between the stand-alone office machine and the memory storage device of the computer.

7. The method of claim 1 wherein the placing step includes placing the identification of the message processing capabilities of the computer into a capabilities data store.

8. The method of claim 1 wherein the determining step includes:

accessing the computer repeatedly for a predetermined period of time or until the computer responds, whichever occurs first.

9. The method of claim 1 wherein the capabilities of the computer include one or more of the following capabilities:

storing a message received in the stand-alone office machine on a disk in the computer, performing a binary file transfer of a file stored on the disk to a second computer using the stand-alone office machine, encrypting a message, decrypting a message, routing a message received in the stand-alone office machine to the second computer, enhancing resolution of an image in a message,1 and attaching a file from the disk to a fax message to be transferred to the second computer using a fax modem in the stand-alone office machine.

10. The method of claim 1 wherein the capabilities of the computer include the following capabilities:

storing a message received in the stand-alone office machine on a disk in the computer, performing a binary file transfer of a file stored on the disk to a second computer using the stand-alone office machine, and attaching a file to a fax message to be transferred to the second computer by a fax modem in the stand-alone office machine.

11. In a system comprising a computer with an office machine interface and a first capabilities determination module, and a stand-alone office machine including a fax machine, a computer interface, an enhanced protocol that supports enhanced capabilities of the computer, a standard protocol that supports stand-alone capabilities of the stand-alone office machine, and a second capabilities determination module, a method for adding capabilities of the computer to the stand-alone office machine comprising:

determining whether the computer is available to provide enhanced capabilities to the stand-alone office machine;

if the computer is available, then:

transferring an identification of the enhanced capabilities of the computer from the first capabilities determination module to the second capabilities determination module through the office machine interface;

placing the identification of the enhanced capabilities in a capabilities data store using the second capabilities determination module;

selecting the enhanced protocol when the computer is available and selecting the standard protocol when the computer is not available;

processing a fax message with the fax machine using the standard protocol and using only one or more of the stand-alone capabilities of the stand-alone office machine when the computer is not available;

processing the fax message with the fax machine and the computer using the enhanced protocol and using one or more of the enhanced capabilities provided by the computer;

sending a first list or identification of enhanced capabilities of the fax machine to a second fax machine in communication with the fax machine when the computer is available to provide the enhanced capabilities; and sending a second list or identification of standard capabilities of the fax machine when the computer is not available to provide the enhanced capabilities.

12. The method of claim 11 wherein the enhanced capabilities include one or more of the following capabilities: storing a message received in the stand-alone office machine on a disk in the computer, performing a binary file transfer of a file stored on the disk to a second computer using the stand-alone office machine, encrypting a message, decrypting a message, routing a message received in the stand-alone office machine to the second computer, enhancing resolution of an image in a message, and attaching a file from the disk to a fax message to be transferred to the second computer using a fax modem in the stand-alone office machine.

13. An apparatus for enhancing capabilities of a stand-alone office machine comprising:

a computer coupled to a stand-alone office machine;

the computer being programmed to provide enhanced capabilities to the stand alone office machine; the computer having an office machine interface for transferring a message between the computer and the stand-alone office machine, and for sending an identification of the enhanced capabilities to the stand-alone office machine, and having a message module for processing the message using one or more of the enhanced capabilities; and the stand-alone office machine having:

a) a computer interface in communication with the office machine interface of the computer for transferring the message between the computer and the stand-alone office machine;

b) a capabilities determination module in communication with the computer interface for determining whether the computer is available, and if the computer is available, for obtaining and storing the identification of the enhanced capabilities of the computer in a capabilities data store;

c) an enhanced protocol module in communication with the computer interface for sending the message to, or receiving the message from the computer, and for invoking the enhanced capabilities of the computer to process the message when the computer is available; and d) a standard protocol module in communication with the capabilities determination module for processing the message in the stand-alone office machine using only one or more standard capabilities of the stand-alone office machine wherein the stand-alone office machine is in communication with a second office machine, and the enhanced protocol module is operable to control the transfer of an identification of the enhanced capabilities of the stand-alone office machine to the second office machine.

14. The apparatus of claim 13 wherein the stand-alone office machine includes a fax machine.

15. The apparatus of claim 13 wherein the computer further includes:

a memory storage device; and and wherein the message module is in communication with the memory storage device and the office machine interface for transferring the message between the memory storage device and the stand-alone office machine.

16. The apparatus of claim 13 wherein the capabilities determination module further includes an NSF builder in communication with the capabilities data store for building an NSF frame listing the capabilities of the stand-alone office machine.

17. The apparatus of claim 16 wherein the enhanced protocol module is in communication with the NSF builder for receiving the NSF frame and for selecting a protocol from the NSF frame.

18. The apparatus of claim 13 wherein the enhanced protocol module is operable to instruct the second office machine not to store the identification of the enhanced capabilities of the stand-alone office machine when the computer is being used to provide the enhanced capabilities to the stand-alone office machine.

19. An office machine providing dual modes of operation by interfacing with a computer, the office machine comprising:

a) a computer interface in communication with an office machine interface of a computer; and b) a capabilities determination module in communication with the computer interface for determining whether the computer is available, and if the computer is available, for obtaining and storing an identification of enhanced capabilities of the computer; and c) a protocol module in communication with the computer interface, wherein the protocol module includes an enhanced protocol module for sending a message to, or receiving a message from the computer, and for using the enhanced capabilities of the computer to process the message when the computer is available, and a standard protocol module for processing the message in the stand-alone office machine using only one or more standard capabilities of the stand-alone office machine when the computer is not available to provide the enhanced capabilities, and wherein the protocol module is in communication with a second office machine for identifying capabilities of the office machine depending on whether the computer is available to provide the enhanced capabilities.

20. The office machine of claim 19 wherein the office machine is a fax machine.

21. The office machine of claim 19 wherein the capabilities determination module includes:

a PC capabilities determination module in communication with the computer interface; and a capabilities data store in communication with the PC capabilities determination module for storing an identification of capabilities of the office machine.

22. The office machine of claim 21 wherein the capabilities determination module further includes an NSF builder in communication with the capabilities data store for building an NSF frame, and for filling the NSF frame with an identification of the capabilities of the stand-alone office machine.

23. The office machine of claim 22 wherein the protocol module is in communication with the NSF builder for receiving the NSF frame, for reading the NSF frame, and for determining whether to use the enhanced protocol module or the standard protocol module to process the message based on data in the NSF frame.

24. The apparatus of claim 19 wherein the protocol module is in communication with the second office machine for instructing the second office machine not to store the capabilities of the office machine when the computer is available to provide the enhanced capabilities.

* * * * *

UNITED STATES PATENT AND TRADEMARK OFFICE
CERTIFICATE OF CORRECTION

PATENT NO. : 5,666,489

DATED : September 8, 1997

INVENTOR(S) : Fite, Jr., et al.

Page 1 of 2

It is certified that error appears in the above-indentified patent and that said Letters Patent is hereby corrected as shown below:

Column 2, line 23, "enables he" should read --enables the--.

Column 2, line 64, "capabilities°"" should read --capabilities.--.

Column 4, line 3, "local-area" should read --local area--

Column 6, line 13, "module, 70" should read --module 70--.

Column 6, line 19, "are-the" should read --are the--.

Column 6, line 54, "PC availability" should read --PC is on, availability--.

Column 7, line 1, "available and" should read --available, and--.

Column 7, line 18, "the capabilities" should read --the PC capabilities--.

Column 8, line 2, "There-are" should read --There are--.

Column 9, line 41, "machine, in" should read --machine in--.

Column 11, line 51, "machine" should read --machine;--.

UNITED STATES PATENT AND TRADEMARK OFFICE
CERTIFICATE OF CORRECTION

PATENT NO. : 5,666,489

DATED : September 8, 1997

INVENTOR(S) : Fite, Jr., et al.

It is certified that error appears in the above-indentified patent and that said Letters Patent is hereby corrected as shown below:

Column 10, line 23, "message,1 and" should read --message, and--.

Signed and Sealed this

Twenty-first Day of July, 1998

*Attest:*

BRUCE LEHMAN

*Attesting Officer*      *Commissioner of Patents and Trademarks*